No. 767,917. PATENTED AUG. 16, 1904.
J. L. TAYLOR.
DOUBLE LID FOR SYRUP CUPS, &c.
APPLICATION FILED DEC. 7, 1903.
NO MODEL.
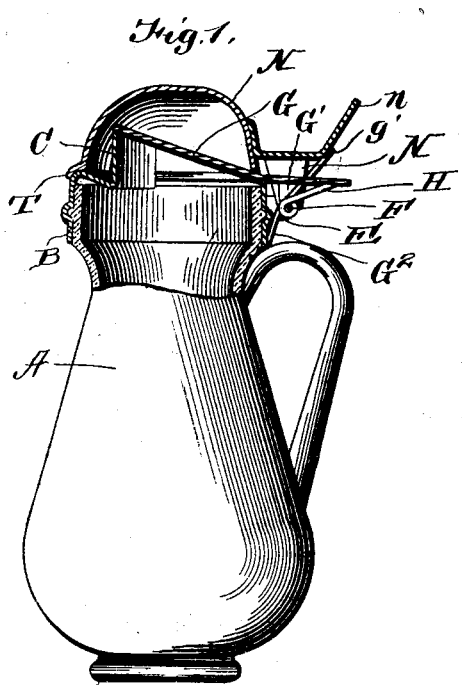
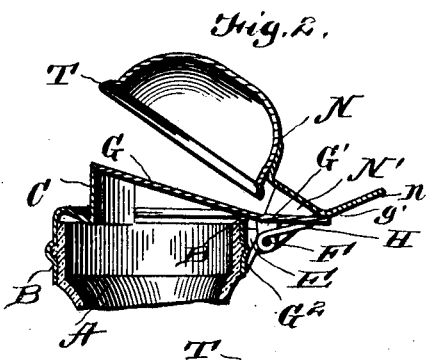
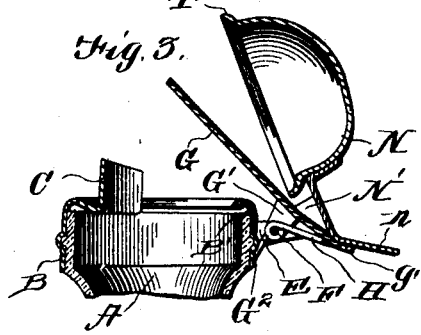
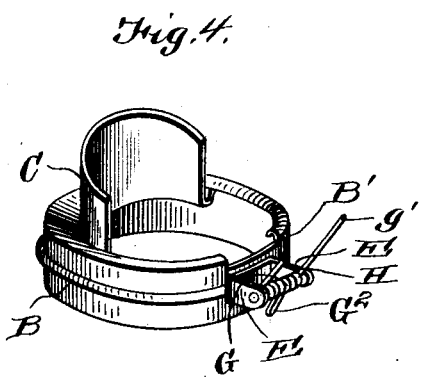
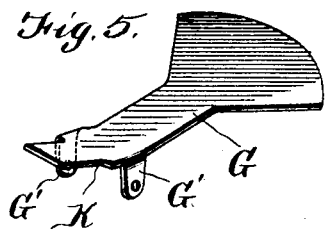
WITNESSES:
R. A. Boswell
A. L. Hough
INVENTOR
John L. Taylor,
BY
Franklin N. Hough
Attorney No. 767,917.

Patented August 16, 1904.

UNITED STATES PATENT OFFICE.

JOHN L. TAYLOR, OF BOZEMAN, MONTANA.

DOUBLE LID FOR SYRUP-CUPS, &c.

SPECIFICATION forming part of Letters Patent No. 767,917, dated August 16, 1904.

Application filed December 7, 1903. Serial No. 184,172. (No model.)

*To all whom it may concern:*

Be it known that I, JOHN L. TAYLOR, a citizen of the United States, residing at Bozeman, in the county of Gallatin and State of Montana, have invented certain new and useful Improvements in Double Lids for Syrup-Cups, &c.; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in tops for pitchers, and especially in the provision of a double-lid top adapted especially for syrup-pitchers; and the object of the invention is to generally improve upon and render more efficient this type of device.

More specifically, the invention comprises a double-lid top, the inner lid being provided for the purpose of cutting off the supply of liquid and providing means for the drippings to return into the pitcher, and in the provision of a cover or upper lid which is adapted as it is opened to actuate the inner lid and throw the same open, while in the closing of the lids the inner one is adapted to shut off the supply of liquid being dispensed before the outer lid closes over the inner one.

The invention consists, further, in various details of construction and combinations of parts, which will be hereinafter fully described, and then specifically defined in the appended claim.

My invention is illustrated in the accompanying drawings, which, with the letters of reference marked thereon, form a part of this application, and in which—

Figure 1 is a sectional view through the top of a pitcher, showing my improved lids for the pitcher, the same being illustrated as closed. Fig. 2 is a sectional view through a pitcher, showing the extent to which the outer lid may be thrown open before the inner lid begins to open. Fig. 3 is a similar view showing both lids open. Fig. 4 is a detail view of the band around the top of the pitcher with the lids removed. Fig. 5 is a detail view of the inner lid.

Reference now being had to the details of the drawings by letter, A designates a pitcher or receptacle of any suitable shape having a band B about the neck thereof, and C designates a lip which is formed integral with the band, but positioned a slight distance in from the outer circumference of the band, the space intervening between said lip and the outer portion of the band being slightly grooved in order to provide means whereby any drippings from the lip after the dispensing of syrup or other liquid in the receptacle has been cut off may run back into the pitcher. Projecting from said band are ears E E, carrying a pivotal pin F, and G designates the inner lid of the top, the forward end of which lid is preferably fan-shaped and is adapted to conform to the shape of the end of said lip, while the shank portion of said lid, which is contracted, is guided in a recessed portion B' of the band and is provided with ears G' adjacent to its outer end, which ears are pivotally mounted upon the pin F. The ears G' are positioned a short distance in from the outer end of the inner lid, and the projecting shank portion of the lid outside of the ears serves two purposes—one of which is to afford abutting means against which the end of the coil-spring H, mounted upon the pivot-pin F, is adapted to bear to normally hold the flaring end of the lid in contact with said nose or lip, and the other purpose of said projecting end is to provide means against which the shank portion of the lid N is adapted to contact for the purpose of raising the inner lid from the lip upon said band. Said lid N has ears N', which are pivotally mounted upon the pin F, and has the end of its shank portion bent to form a handle $n$, convenient for engagement with the thumb of the hand of an operator. Said outer lid N is held closed by an end $g'$ of said spring, and the portion of the edge of the shank portion of the inner lid is cut away, as at K, to allow the inner lid to swing without interfering with the end $g'$ of the spring. A portion of the spring G is bent upon itself, as at $G^2$, and bears against the outer circumference of the band for the purpose of causing the spring to be under tension as the lids are thrown open. The marginal edge of the outer lid or cover, which is of slightly greater diameter than that of the band, is flanged, as at T, and adapted to rest over the lip and contact with the upper edge of the band, as shown, with the extreme edge overhanging the band, and in whatever position the outer lid or cover is in it is at all times free from the inner lid and out of contact with the grooved portion of the band down which the drippings of the syrup or other liquid in the receptacle runs.

In operation it will be observed that the inner lid is normally closed after the outer lid is partially opened, and when the shank portion of the outer lid or cover contacts with the outwardly-projecting end of the shank portion of the inner lid and further pressure is applied to the handle end of the outer lid the inner lid will begin to open under tension of the spring, which bears against the two lids. After the syrup or other liquid has been poured from the pitcher and when the pressure is relieved from the handle end of the cover or outer lid one end of the spring bearing against the outer end of the shank portion of the inner lid will cause the latter to close against the lip or nose upon the band, and any drippings from the lip will run down into the groove and back into the pitcher, and the outer cover or lid as pressure is relieved from the handle will close down over the inner lid and rest upon the upper edge of the band and without coming in contact with the surface which is subjected to the syrup or other liquid, thereby keeping the outer lid entirely clean.

While I have shown a particular construction of apparatus embodying my improved double lid for syrup-pitchers, &c., it will be understood that I may make alterations in the detailed construction of the same without in any way departing from the spirit of the invention.

Having thus described my invention, what I claim as new, and desire to secure by Letters Patent, is—

A top for a syrup-pitcher comprising in combination with a band fitted to the rim of a pitcher and provided with a suitable lip, the upper end of said band being turned to form a flange with a recessed portion opposite said lip, arms projecting from said band adjacent to and beneath the end walls of said recessed portion, a pin carried by said arms, a lid having apertured lugs at right angles thereto pivotally mounted upon said pin, the contracted portion of said lid guided in said recess and having a flaring end adapted to contact with said lip, a cover having ears pivoted to said pin, and designed to close over said band, and a spring carried by said pin having a portion thereof bent upon itself and bearing against said band, the ends of said spring bearing respectively against said lid and cover, as shown and described.

In testimony whereof I hereunto affix my signature in presence of two witnesses.

JOHN L. TAYLOR.

Witnesses:
 BYRDA COX,
 HENRY B. M. BERENTSON.